Nov. 9, 1937.  W. C. HEDGCOCK  2,098,661
TRUCK
Filed Nov. 10, 1933   2 Sheets-Sheet 2
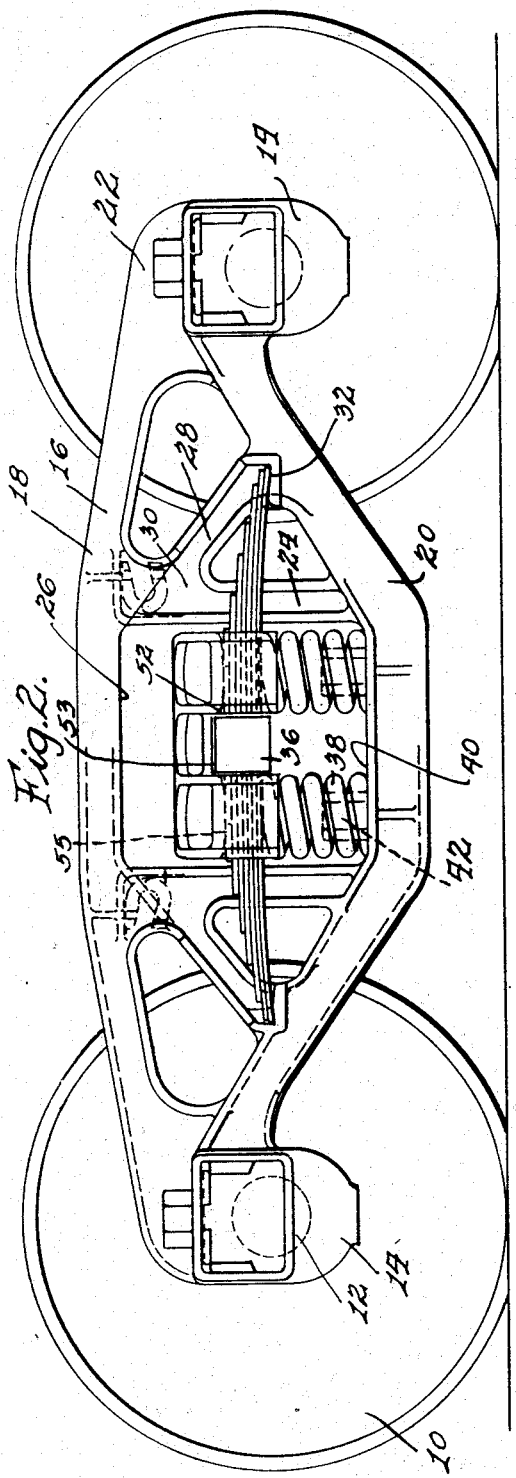
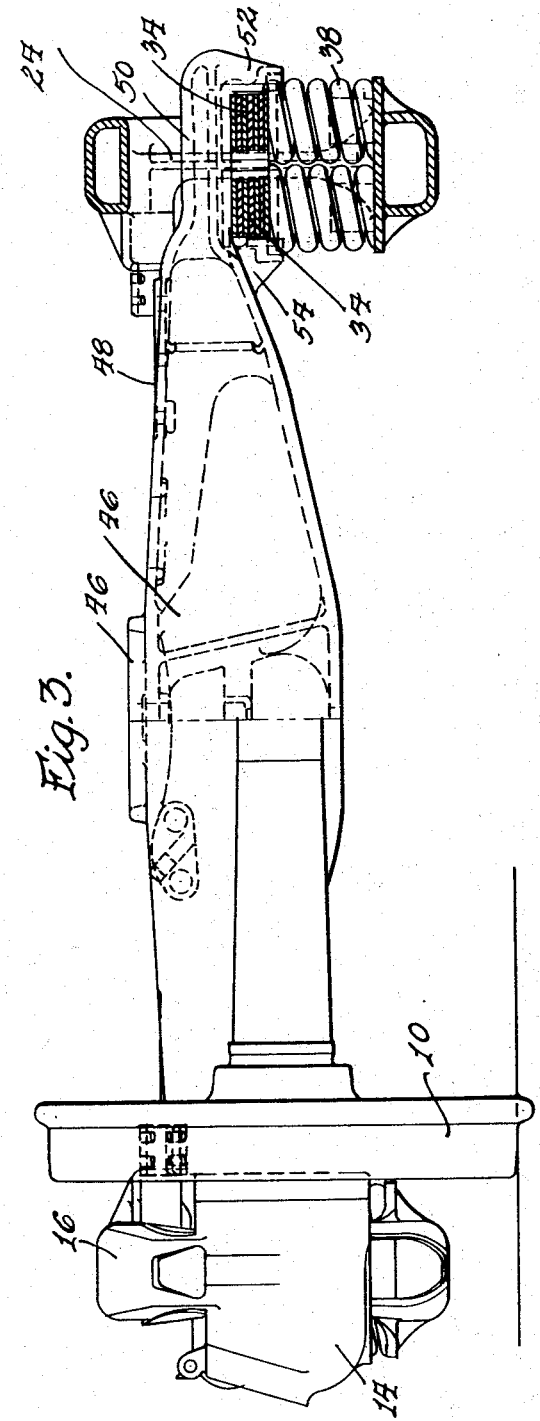
Inventor
William C. Hedgcock
By Wilkinson, Huxley, Byron Knight
Attys.

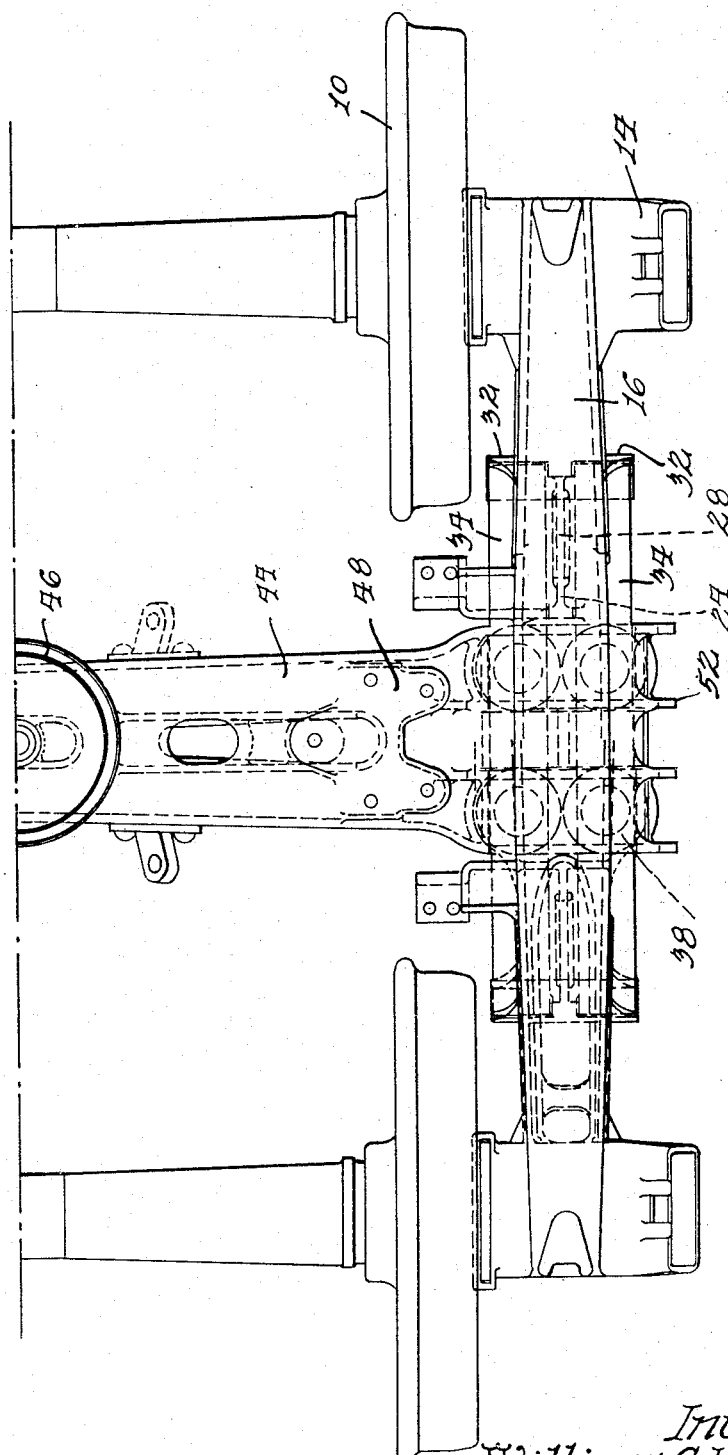

Patented Nov. 9, 1937

2,098,661

UNITED STATES PATENT OFFICE 2,098,661

TRUCK

William C. Hedgcock, Chicago, Ill., assignor to American Steel Foundries, Chicago, Ill., a corporation of New Jersey Application November 10, 1933, Serial No. 697,379

33 Claims. (Cl. 105—197.1)

This invention pertains to car trucks.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car. The resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity; that is, in constructions heretofore contemplated a device constructed to provide sufficient friction for rough track conditions would be inadequate and the spring devices used would be too stiff for average or good track conditions.

Passenger car trucks are generally easy riding, due to the use of both coil and elliptic leaf springs in series, the coil springs responding to the light, quick shocks, the leaf springs to the slow, heavy impulses. Coil springs are quick and sensitive to response, leaf springs relatively less so, partly due to frictional work absorption between the leaves. For this reason, and also by providing coil and leaf springs or springs of different characteristics, they tend to dampen each other's vibration without impairing free spring response.

Although the usual passenger car truck with series arrangement of coil and leaf springs gives good riding qualities, it is in general undesirably heavy, costly and complicated for freight service. This is particularly due to the complete duplication of carrying capacity in both coil and leaf springs.

It is therefore an object of this invention to provide a car truck which provides good riding qualities, and at the same time is economical to make and maintain, is simple and light in construction, and fulfills all requirements of manufacture and service.

Another object is to provide a car truck wherein springs of different character are arranged so that each tends to dampen out the vibrations of the other.

Still another object is to provide spring assemblies wherein there is provided softer cushioning action under light loads, while at the same time providing the necessary stiffness and capacity under heavy loads, these features being combined also to provide a structure which reduces any tendency toward synchronous vibration of the springs.

A further object is to provide a truck construction wherein a plurality of resilient members of different character are disposed with relation to each other so that certain of the members are loaded by the other members to increase the amount of energy they will absorb.

A yet further object is to provide a truck construction wherein the load carrying member is supported on the side frame by resilient members of different characteristics and so arranged that certain of the resilient members support a greater portion of the load than other of the resilient members.

Another further object is to provide a truck construction wherein the load carrying member is carried on the side frame by means which varies its effective load transmitting length according to the imposed load.

Yet a further object is to provide a laminated spring arrangement wherein the parts are positively and inherently prevented from dissociation or dislocation.

A different object is to provide a truss type side frame for use with a series-parallel spring arrangement.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary top plan view of a truck construction embodying the invention;

Figure 2 is a side elevation of the truck construction shown in Figure 1;

Figure 3 is an end elevation partly in section of the truck construction shown in Figures 1 and 2, the section being taken substantially at one of the columns of the side frame.

In the truck illustrated, the wheel and axle assemblies 10 have the journal ends 12 thereof received in suitable journal boxes 14 of the side frame 16, conventional brasses and wedges being provided between the journal ends and said journal boxes. The side frame 16 is of truss construction, including a compression member 18 and a tension member 20 merged adjacent the ends thereof as at 22, said ends being provided with the journal boxes 14. Spaced integral columns or vertical struts 24 connect the tension and compression members to form the bolster opening or window 26. Diagonally disposed auxiliary columns or struts 28 extend from the upwardly extending side portions of the tension member 20 between the columns 24 and the merged portion 22, to the junction of the columns 24 and the compression member whereby a connecting web 30 is disposed between the columns 24 and 28.

The columns 24 and 28 are of less width than the tension and compression members, and the arcuate leaf spring seats 32 are disposed on the side portions of the tension member at the junction of said tension member and the auxiliary columns 28 and on each side thereof to support the ends of the spaced longitudinally disposed semi-elliptic leaf springs 34, the seats extending outwardly of the side frame. Said leaf springs 34 are provided with the centrally disposed spring bands 36 and the coil springs 38 engage the underside of the leaf springs on each side of the spring bands and are seated on the substantially horizontal central portion or spring seat portion 40 of the tension member between the columns, being positioned thereon by means of the upwardly extending dowels 42.

The load carrying member, which in the construction shown is the bolster 44, is provided with the center bearing 46 and the side bearing 48. The end 50 of said bolster is depressed and extends through the window, and has the downwardly extending strengthening and positioning ribs 52, the central pair of said ribs forming a spring band recess 53 for receiving the spring band 36 whereby said ribs and the inner downwardly extending positioning ribs 54 disposed on each side of the spring band 36 serve to position the bolster with respect to the side frame and springs. Spring seats 55 are provided on the ends 50 between the end and central ribs so that when the seats are disposed in supported engagement on the leaf springs, they are in substantially vertical alignment with the coil springs.

In the truck construction shown, an advantageous spring arrangement is thus provided with the truss type of side frame, the springs being disposed so that the leaf and coil springs are in series-parallel whereby downward movement of the load carrying member causes the leaves of the semi-elliptic leaf springs to be more tightly pressed together by the downward movement of the bolster and the upward resisting movement of the coil springs, whereby the frictional absorption of the leaf springs is increased over that of a truck using only leaf springs or using leaf and coil springs in parallel. The arcuate seats 32 cause the effective length of the leaf springs to be decreased upon compression of the coil springs whereby the leaf springs are shortened under load, and their capacity thus increased.

Thus a sturdy and easy riding truck is provided.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a truck, the combination of a side frame, spaced wheel and axle assemblies, said side frame including tension and compression members merging adjacent the ends thereof and provided with journal means cooperating with the journal ends of said wheel and axle assemblies, spaced integral connecting columns forming a window with said tension and compression members, spring seats on one of said last-named members, a resilient member between said seats, a load carrying member extending into said window and supported on said resilient member, and means on said side frame cooperating with said resilient member to load said resilient member to thereby increase the amount of energy said resilient member will absorb.

2. In a truck, the combination of a side frame, spaced wheel and axle assemblies, said side frame including tension and compression members merging adjacent the ends thereof and provided with journal means cooperating with the journal ends of said wheel and axle assemblies, spaced integral connecting columns forming a window with said tension and compression members, spring seats on one of said last-named members, a semi-elliptic leaf spring between said seats, a load carrying member extending into said window and supported on said semi-elliptic leaf spring, and means on said side frame cooperating with said semi-elliptic leaf spring to load said semi-elliptic leaf spring to thereby increase the amount of energy said semi-elliptic leaf spring will absorb.

3. In a truck, the combination of a side frame, spaced wheel and axle assemblies, said side frame including tension and compression members merging adjacent the ends thereof and provided with journal means cooperating with the journal ends of said wheel and axle assemblies, spaced integral connecting columns forming a window with said tension and compression members, spring seats on one of said last-named members, a resilient member between said seats, a load carrying member extending into said window and supported on said resilient member, and means on said side frame in said window cooperating with said resilient member to load said resilient member to thereby increase the amount of energy said resilient member will absorb.

4. In a truck, the combination of a side frame, spaced wheel and axle assemblies, said side frame including tension and compression members merging adjacent the ends thereof and provided with journal means cooperating with the journal ends of said wheel and axle assemblies, spaced integral connecting columns forming a window with said tension and compression members, spring seats on one of said last-named members, a semi-elliptic leaf spring between said seats, a load carrying member extending into said window and supported on said semi-elliptic leaf spring, and means on said side frame in said window cooperating with said semi-elliptic leaf spring to load said semi-elliptic leaf spring to thereby increase the amount of energy said semi-elliptic leaf spring will absorb.

5. In a side frame, the combination of tension and compression members merging adjacent the ends thereof and provided with journal means, spaced columns integrally connecting said tension and compression members and forming a window therewith, leaf spring seats on one of said members and wholly between said journal means and said columns, and auxiliary diagonally disposed columns extending from said leaf spring seats to the other of said members adjacent the intersection thereof with said first-named columns.

6. In a side frame, the combination of tension and compression members merging adjacent the ends thereof and provided with journal means, spaced integrally connecting columns forming a window with said tension and compression members, leaf spring seats provided on one of said members and wholly between said columns and said journal means, diagonally disposed auxiliary columns extending from adjacent said leaf spring seats to said other member adjacent its intersection with said first-named columns, and coil spring seats disposed on said tension member in said window.

7. In a side frame, the combination of tension and compression members merging adjacent the ends thereof and provided with journal means, spaced integrally connecting columns forming a window with said tension and compression members, leaf spring seats provided on one of said members and wholly between said columns and said journal means, coil spring seats disposed on said tension member in said window, and auxiliary columns extending from said leaf spring seats to said columns and said other member.

8. In a bolster, the combination of a substantially box-shaped body portion provided with center and side bearings, the tension and compression members of said body portion being provided at the ends thereof with spaced leaf spring seats, said end portions being provided with a spring band recess intermediate said seats, and spring band embracing means adjacent said seats and substantially coextensive therewith.

9. In a truck, the combination of spaced wheel and axle assemblies, a side frame including tension and compression members merging adjacent the ends thereof and being provided with journal means having cooperative relation with the journal ends of said wheel and axle assemblies, spaced columns integrally connecting said tension and compression members and forming a window therewith, leaf spring seats disposed on said tension member between said columns and said journal means, a semi-elliptic leaf spring the ends of which are supported on said leaf spring seats, coil springs disposed in said window and engaging said leaf spring, and a load carrying member extending into said window and supported on said leaf spring in substantially vertical alignment with said coil springs.

10. In a truck, the combination of a side frame, spaced wheel and axle assemblies, said side frame including tension and compression members merging adjacent the ends thereof and provided with journal means cooperating with the journal ends of said wheel and axle assemblies, spaced integral connecting columns forming a window with said tension and compression members, spring seats on one of said last-named members, a resilient member between said seats and on each side of said columns, a load carrying member extending into said window and supported on each of said resilient members, and means on said side frame cooperating with said resilient members to load said resilient members to thereby increase the amount of energy said resilient members will absorb.

11. In a truck, the combination of a side frame, spaced wheel and axle assemblies, said side frame including tension and compression members merging adjacent the ends thereof and provided with journal means cooperating with the journal ends of said wheel and axle assemblies, spaced integral connecting columns forming a window with said tension and compression members, spring seats on one of said last-named members, a resilient member between said seats, a load carrying member supported on said resilient member, and means on said side frame cooperating with said resilient member to load said resilient member to thereby increase the amount of energy said resilient member will absorb.

12. In a truck, the combination of spaced wheel and axle assemblies, a side frame including tension and compression members merging adjacent the ends thereof and being provided with journal means having cooperative relation with the journal ends of said wheel and axle assemblies, spaced columns integrally connecting said tension and compression members and forming a window therewith, leaf spring seats disposed on said tension member between said columns and said journal means, a semi-elliptic leaf spring the ends of which are supported on said leaf spring seats, coil springs disposed on one of said members and engaging said leaf spring, and a load carrying member extending into said window and supported on said leaf spring in substantially vertical alignment with said coil springs.

13. In a truck, the combination of spaced wheel and axle assemblies, a side frame including tension and compression members merging adjacent the ends thereof and being provided with journal means having cooperative relation with the journal ends of said wheel and axle assemblies, spaced columns integrally connecting said tension and compression members and forming a window therewith, leaf spring seats disposed on said tension member between said columns and said journal means and on each side of said columns, longitudinally disposed leaf springs the ends of which are supported on said leaf spring seats, coil springs disposed in said window and engaging each of said leaf springs, and a load carrying member supported on said leaf springs in substantially vertical alignment with said coil springs.

14. In a truck, the combination of a side frame, spaced wheel and axle assemblies, said side frame including tension and compression members merging adjacent the ends thereof and provided with journal means cooperating with the journal ends of said wheel and axle assemblies, spaced integral connecting columns forming a window with said tension and compression members, spring seats on said tension member, an auxiliary column extending from said spring seats to the adjacent column, a resilient member between said seats, a load carrying member extending into said window and supported on said resilient member, and means on said side frame cooperating with said resilient member to load said resilient member to thereby increase the amount of energy said resilient member will absorb.

15. In a truck, the combination of a side frame, spaced wheel and axle assemblies, said side frame including tension and compression members merging adjacent the ends thereof and provided with journal means cooperating with the journal ends of said wheel and axle assemblies, spaced integral connecting columns forming a window with said tension and compression members, arcuate spring seats on said tension member, an auxiliary column extending from said spring seats to the adjacent column, a semi-elliptic leaf spring between said seats, deflection of said leaf spring causing shortening of the effective length thereof, a load carrying member extending into said window and supported on said semi-elliptic leaf spring, and means on said side frame cooperating with said semi-elliptic leaf spring to load said semi-elliptic leaf spring to thereby increase the amount of energy said semi-elliptic leaf spring will absorb.

16. In a truck, the combination of a side frame, spaced wheel and axle assemblies, said side frame including tension and compression members merging adjacent the ends thereof and provided with journal means cooperating with the journal ends of said wheel and axle assemblies, spaced integral connecting columns forming a window with said tension and compression members, arcuate spring seats on one of said last-named members, a semi-elliptic leaf spring between said seats, deflection of said leaf spring causing shortening of the effective length thereof, a load carrying member extending into said window and supported on said semi-elliptic leaf spring, and means on said side frame cooperating with said semi-elliptic leaf spring to load said semi-elliptic leaf spring to thereby increase the amount of energy said semi-elliptic leaf spring will absorb.

17. In a truck, the combination of a side frame, spaced wheel and axle assemblies, said side frame including tension and compression members merging adjacent the ends thereof and provided with journal means cooperating with the journal ends of said wheel and axle assemblies, spaced integral connecting columns forming a window with said tension and compression members, arcuate spring seats on said tension members, a semi-elliptic leaf spring between said seats, deflection of said leaf spring causing shortening of the effective length thereof, a load carrying member extending into said window and supported on said semi-elliptic leaf spring, and means on said side frame cooperating with said semi-elliptic leaf spring to load said semi-elliptic leaf spring to thereby increase the amount of energy said semi-elliptic leaf spring will absorb.

18. In a truck, the combination of a side frame, spaced wheel and axle assemblies, said side frame including tension and compression members merging adjacent the ends thereof and provided with journal means cooperating with the journal ends of said wheel and axle assemblies, spaced integral connecting columns forming a window with said tension and compression members, arcuate spring seats on said tension members between said columns and said journal means, a semi-elliptic leaf spring between said seats, deflection of said leaf spring causing shortening of the effective length thereof, a load carrying member extending into said window and supported on said semi-elliptic leaf spring, and means on said side frame cooperating with said semi-elliptic leaf spring to load said semi-elliptic leaf spring to thereby increase the amount of energy said semi-elliptic leaf spring will absorb.

19. In a truck, the combination of spaced wheel and axle assemblies, a side frame including tension and compression members connected together adjacent the ends thereof and being provided with journal means having cooperative relation with the journal ends of said wheel and axle assemblies, spaced columns connecting said tension and compression members and forming a window therewith, seats disposed on said tension member between said columns and said journal means, a flexible member extending between and having its ends supported by direct engagement on said seats, and a load carrying member extending into said window and supported on said flexible member, the portion of the load carrying member in said window being spaced from said columns, the engagement between said load carrying member and said flexible member being so constructed and arranged that end thrusts are taken directly by said flexible member from said load carrying member.

20. In a truck, the combination of spaced wheel and axle assemblies, a side frame including tension and compression members connected together adjacent the ends thereof and being provided with journal means having cooperative relation with the journal ends of said wheel and axle assemblies, spaced columns connecting said tension and compression members and forming a window therewith, seats disposed on said tension member between said columns and said journal means, a flexible member extending between and having its ends supported on said seats, a load carrying member extending into said window and supported on said flexible member, and means on said side frame cooperating with said flexible member to load the same member to thereby increase the amount of energy said flexible member will absorb.

21. In a truck, the combination of spaced wheel and axle assemblies, a side frame including tension and compression members connected together adjacent the ends thereof and being provided with journal means having cooperative relation with the journal ends of said wheel and axle assemblies, spaced columns connecting said tension and compression members and forming a window therewith, leaf spring seats disposed on said tension member between said columns and said journal means, a leaf spring extending between and having its ends supported by direct engagement on said seats, and a load carrying member extending into said window and supported on said leaf spring, the portion of the load carrying member in said window being spaced from said columns, the engagement between said load carrying member and said flexible member being so constructed and arranged that end thrusts are taken directly by said flexible member from said load carrying member.

22. In a truck, the combination of spaced wheel and axle assemblies, a side frame including tension and compression members connected together adjacent the ends thereof and being provided with journal means having cooperative relation with the journal ends of said wheel and axle assemblies, spaced columns connecting said tension and compression members and forming a window therewith, leaf spring seats disposed on said tension member between said columns and said journal means, a leaf spring extending between and having its ends supported on said seats, a load carrying member extending into said window and supported on said leaf spring, and means on said side frame cooperating with said leaf spring to load the same to thereby increase the amount of energy said leaf spring will absorb.

23. In a truck, the combination of spaced wheel and axle assemblies, a side frame including tension and compression members connected together adjacent the ends thereof and being provided with journal means having cooperative relation with the journal ends of said wheel and axle assemblies, spaced columns connecting said tension and compression members and forming a window therewith, seats disposed on said tension member between said columns and said journal means and on each side of said columns, a flexible member disposed on each side of said side frame and having its ends supported by direct engagement on said seats, and a load carrying member extending into said window and supported on said flexible members, the portion of the load carrying member in said window being spaced from said columns, the engagement between said load carrying member and said flexible member being so constructed and arranged that end thrusts are taken directly by said flexible member from said load carrying member.

24. In a truck, the combination of spaced wheel and axle assemblies, a side frame including tension and compression members connected together adjacent the ends thereof and being provided with journal means having cooperative relation with the journal ends of said wheel and axle assemblies, spaced columns connecting said tension and compression members and forming a window therewith, seats disposed on said tension member between said columns and said journal means and on each side of said columns, a flexible member disposed on each side of said side frame and having their ends supported on said seats, a load carrying member extending into said window and supported on said flexible members, and means on said side frame cooperating with said flexible members to load the same to thereby increase the amount of energy said flexible members will absorb.

25. In a truck, the combination of spaced wheel and axle assemblies, a side frame including tension and compression members connected together adjacent the ends thereof and being provided with journal means having cooperative relation with the journal ends of said wheel and axle assemblies, spaced columns connecting said tension and compression members and forming a window therewith, leaf spring seats disposed on said tension member between said columns and said journal means and on each side of said columns, a leaf spring disposed on each side of said side frame and having their ends supported on said seats, a load carrying member extending into said window and supported on said leaf springs, and coil springs on said side frame cooperating with said leaf springs to load the same to thereby increase the amount of energy said leaf springs will absorb.

26. In a truck, the combination of a side frame, said side frame having spaced journals, a reenforcing strut for said side frame disposed thereon intermediate said journals, a load carrying member disposed adjacent said strut, spaced leaf spring seats disposed on said side frame and longitudinally thereof, a coil spring seat intermediate said leaf spring seats, a longitudinally extending leaf spring disposed on one side of said strut and seated on said leaf spring seats, and a coil spring seated on said coil spring seat, said coil and leaf springs supporting said load carrying member.

27. In a truck, the combination of a side frame, said side frame having spaced journals, a reenforcing strut for said side frame disposed thereon intermediate said journals, a load carrying member disposed adjacent said strut, spaced leaf spring seats disposed on said side frame, a coil spring seat intermediate said leaf spring seats, a leaf spring disposed inboard of said strut and seated on said leaf spring seats, and a coil spring seated on said coil spring seat, said coil and leaf springs supporting said load carrying member.

28. In a truck, the combination of a side frame, said side frame having spaced journals, a reenforcing strut for said side frame disposed thereon intermediate said journals, a load carrying member disposed adjacent said strut, spaced leaf spring seats disposed on and substantially fixed with respect to said side frame, a coil spring seat intermediate said leaf spring seats, a leaf spring disposed outboard of said strut and seated on said leaf spring seats, and a coil spring seated on said coil spring seat, said coil and leaf springs supporting said load carrying member.

29. In a truck, the combination of a side frame, said side frame having spaced journals, a reenforcing strut for said side frame disposed thereon intermediate said journals, a load carrying member disposed adjacent said strut, spaced leaf spring seats disposed on said side frame, a coil spring seat intermediate said leaf spring seats, leaf springs disposed on opposite sides of said strut and seated on said leaf spring seats, and a coil spring seated on said coil spring seat, said coil and leaf springs supporting said load carrying member.

30. In a truck, the combination of a side frame having spaced journals and a window, a load carrying member having center and side bearings, said load carrying member extending into said window and spaced from the sides thereof, spaced fixed spring seats on said side frame disposed between said window and said journals, and a leaf spring supporting said load carrying member and having the ends in supporting engagement with said seats the support between said leaf spring and load carrying member being so constructed and arranged that thrusts are taken directly by said leaf spring from said load carrying member.

31. In a truck, the combination of a side frame having spaced journals, tension and compression members merging adjacent said journals, said tension member having a central portion and upwardly extending side portions, a strut connecting each of said side portions and said compression member, a leaf spring seat disposed on each of said side portions at the junction of said struts and side portions and outwardly extending from said struts, a semi-elliptic leaf spring having the ends thereof engagingly supported on said seats, and a load carrying member disposed between said struts and supported on said leaf spring.

32. In a truck, the combination of a side frame having spaced journals, tension and compression members merging adjacent said journals, said tension member having a central portion and upwardly extending side portions, a strut connecting each of said side portions and said compression member, a leaf spring seat disposed on each of said side portions at the junction of said struts and side portions and outwardly extending from said struts, a semi-elliptic leaf spring having the ends thereof engagingly supported on said seats, and a load carrying member disposed between said struts and supported on said leaf spring at a plurality of points.

33. In a truck, the combination of a side frame having spaced journals, tension and compression members merging adjacent said journals, said tension member having a central portion and upwardly extending side portions, a strut connecting each of said side portions and said compression member, a leaf spring seat disposed on each of said side portions at the junction of said struts and side portions and outwardly extending from said struts, a semi-elliptic leaf spring having the ends thereof engagingly supported on said seats, a load carrying member disposed between said struts and supported on said leaf spring at a plurality of points, and coil springs supported on said compression member and engaging said leaf spring substantially in vertical alignment with said plurality of points.

WILLIAM C. HEDGCOCK.